E. SCHNEIDER.
SAFETY APPARATUS CONTROLLING THE FASTENING MECHANISM BETWEEN LARGE CALIBER GUNS AND THEIR LOADING TRUCKS.
APPLICATION FILED SEPT. 6, 1917.

1,315,609.

Patented Sept. 9, 1919.
9 SHEETS—SHEET 1.

E. SCHNEIDER.
SAFETY APPARATUS CONTROLLING THE FASTENING MECHANISM BETWEEN LARGE CALIBER
GUNS AND THEIR LOADING TRUCKS.
APPLICATION FILED SEPT. 6, 1917.

1,315,609.

Patented Sept. 9, 1919.
9 SHEETS—SHEET 2.

Fig. 2.

Inventor.

E. SCHNEIDER.
SAFETY APPARATUS CONTROLLING THE FASTENING MECHANISM BETWEEN LARGE CALIBER GUNS AND THEIR LOADING TRUCKS.
APPLICATION FILED SEPT. 6, 1917.

1,315,609.

Patented Sept. 9, 1919.
2 SHEETS—SHEET 3.

Inventor.
Eugène Schneider
by
Mauro, Cameron, Lewis & Massie,
Attorneys

E. SCHNEIDER.
SAFETY APPARATUS CONTROLLING THE FASTENING MECHANISM BETWEEN LARGE CALIBER GUNS AND THEIR LOADING TRUCKS.
APPLICATION FILED SEPT. 6, 1917.

1,315,609.

Patented Sept. 9, 1919.
9 SHEETS—SHEET 4.

E. SCHNEIDER.
SAFETY APPARATUS CONTROLLING THE FASTENING MECHANISM BETWEEN LARGE CALIBER GUNS AND THEIR LOADING TRUCKS.
APPLICATION FILED SEPT. 6, 1917.

1,315,609.

Patented Sept. 9, 1919.
9 SHEETS—SHEET 5.

E. SCHNEIDER.
SAFETY APPARATUS CONTROLLING THE FASTENING MECHANISM BETWEEN LARGE CALIBER GUNS AND THEIR LOADING TRUCKS.
APPLICATION FILED SEPT. 6, 1917.

1,315,609.

Patented Sept. 9, 1919.

Inventor.
Eugène Schneider
by,
Mauro, Cameron, Lewis & Massie,
Attorneys.

E. SCHNEIDER.
SAFETY APPARATUS CONTROLLING THE FASTENING MECHANISM BETWEEN LARGE CALIBER GUNS AND THEIR LOADING TRUCKS.
APPLICATION FILED SEPT. 6, 1917.

1,315,609.

Patented Sept. 9, 1919.

Inventor.
Eugène Schneider
by
Mauro, Cameron, Lewis & Massie.
Attorneys.

E. SCHNEIDER.
SAFETY APPARATUS CONTROLLING THE FASTENING MECHANISM BETWEEN LARGE CALIBER GUNS AND THEIR LOADING TRUCKS.
APPLICATION FILED SEPT. 6, 1917.

1,315,609.

Patented Sept. 9, 1919.
9 SHEETS—SHEET 8.

E. SCHNEIDER.
SAFETY APPARATUS CONTROLLING THE FASTENING MECHANISM BETWEEN LARGE CALIBER GUNS AND THEIR LOADING TRUCKS.
APPLICATION FILED SEPT. 6, 1917.

1,315,609.

Patented Sept. 9, 1919.
9 SHEETS—SHEET 9.

Inventor
Eugène Schneider
by Mauro, Cameron, Lewis & Massie
Attorneys

UNITED STATES PATENT OFFICE.

EUGÈNE SCHNEIDER, OF LE CREUZOT, FRANCE, ASSIGNOR TO SCHNEIDER & CIE., OF PARIS, FRANCE, A LIMITED JOINT-STOCK COMPANY OF FRANCE.

SAFETY APPARATUS CONTROLLING THE FASTENING MECHANISM BETWEEN LARGE-CALIBER GUNS AND THEIR LOADING-TRUCKS.

1,315,609.      Specification of Letters Patent.      Patented Sept. 9, 1919.

Application filed September 6, 1917. Serial No. 189,946.

*To all whom it may concern:*

Be it known that I, EUGÈNE SCHNEIDER, a citizen of the French Republic, and a resident of Le Creuzot, Saône-et-Loire, France, have invented a new and useful Improvement in Safety Apparatus Controlling the Fastening Mechanism Between Large-Caliber Guns and Their Loading-Trucks, which invention is fully set forth in the following specification.

This invention has for its object to provide an improved safety apparatus for preventing the fastening mechanism between a large caliber gun and its loading truck from being closed so long as the locking mechanism for locking the gun to its slide remains unlocked.

This improved apparatus consists essentially of a movable member located in the slide or carried by the gun barrel and having its movements dependent on the movements of one of the movable parts of the locking mechanism between the gun barrel and the slide, and which so long as this locking mechanism remains unlocked, will prevent the interengagement of the parts of the fastening mechanism between the gun barrel and the loading truck. Inversely, when the locking mechanism between the gun barrel and the slide is locked, the said dependent movable member is caused to become inoperative so as to allow the parts of the fastening mechanism between the gun barrel and the loading truck to engage with one another. The loading truck is usually brought up against the breech of the gun barrel along a track having an inclination to the ordinary loading angle, so that the said truck will tend to move away from the breech by its own weight so long as the fastening between the loading truck and the gun barrel cannot become operative.

The action of the dependent movable member for preventing the interengagement of the parts of the fastening mechanism between the loading truck and the gun barrel so long as the locking mechanism between the gun barrel and the slide remains unlocked, may be combined with the control of a finger adapted to engage in the loading plate of the loading truck, or with the control of a lever adapted to raise the pivoted front portion of said plate.

This invention is illustrated in the accompanying drawings in which:—

Figures 1 to 4 illustrate one embodiment of the invention.

In these figures:—

Figs. 5 to 10 inclusive illustrate a modification of the improved safety apparatus combined with a known mechanism for locking the gun barrel to its slide, different from that shown in the preceding example.

In these figures:—

Figs. 12, 13 and 14 illustrate a fourth modification. In these figures:—

In these various figures, A is the breech end of a large caliber gun barrel; B is the slide to which the gun barrel is adapted to be locked by a suitable known mechanism; C is a loading truck comprising a plate D upon which the projectile E is located. The fore part of this plate D is adapted to engage with the breech of the gun when the loading truck has been brought into the proper position by rolling along the rails $F^1$ provided on the cradle F.

The fastening mechanism between the loading truck C and the breech A of the gun may comprise in a known manner a spring bolt G carried by one of the members, for instance the truck C, engaging in a socket $A^1$ formed in a projection of the breech or behind a projection carried by the breech, or in any other suitable manner.

In the constructional example shown in Figs. 1 to 4, the locking mechanism between the gun barrel A and its slide B is assumed to comprise in a known manner, a cross shaft $B^1$ journaled in the slide and provided with two opposite screw-threads $b$, $b^1$, along which two nuts H, $H^1$ are adapted to travel without rotation. These nuts have projections $h$ and $h^1$ respectively, adapted to engage corresponding lodgments in the gun barrel when the locking is completed, and also engaging by means of grooves $h^2$ with hooks $B^2$ on the slide.

Figure 1:
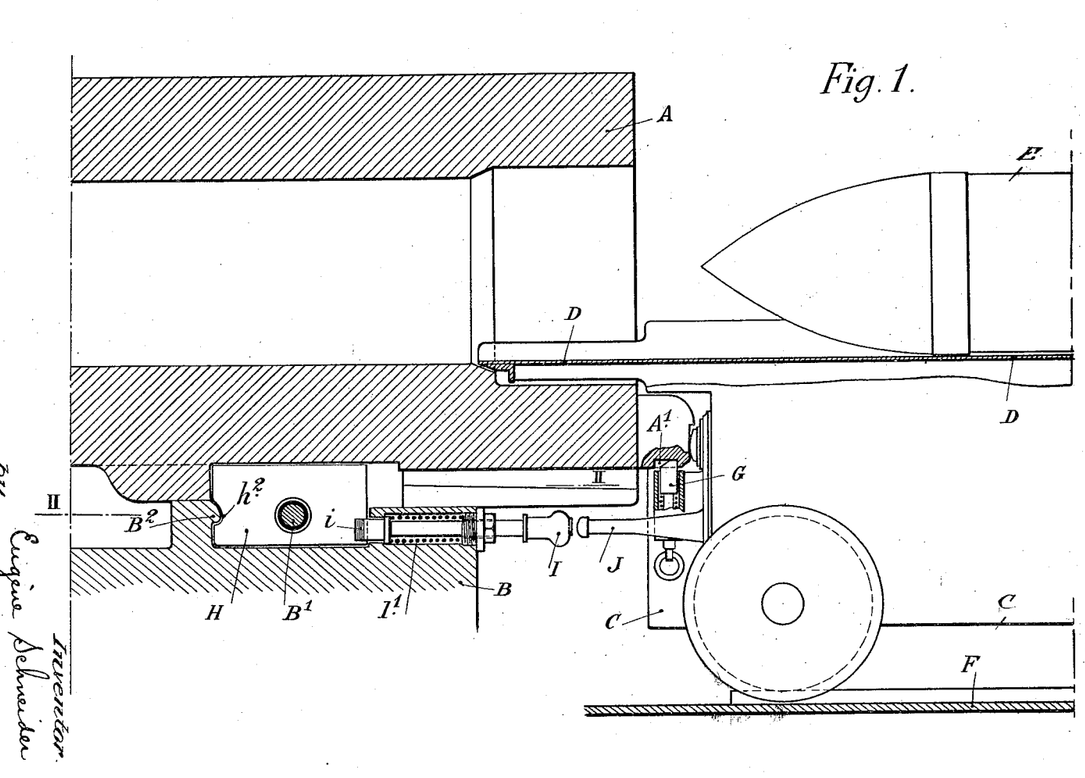
Figs. 1 and 2 are respectively a longitudinal vertical section and a horizontal section on the line II—II of Fig. 1, showing the loading truck fastened to the breech of the gun barrel, the locking mechanism between the gun barrel and its slide being in its locked position.
Figure 2:
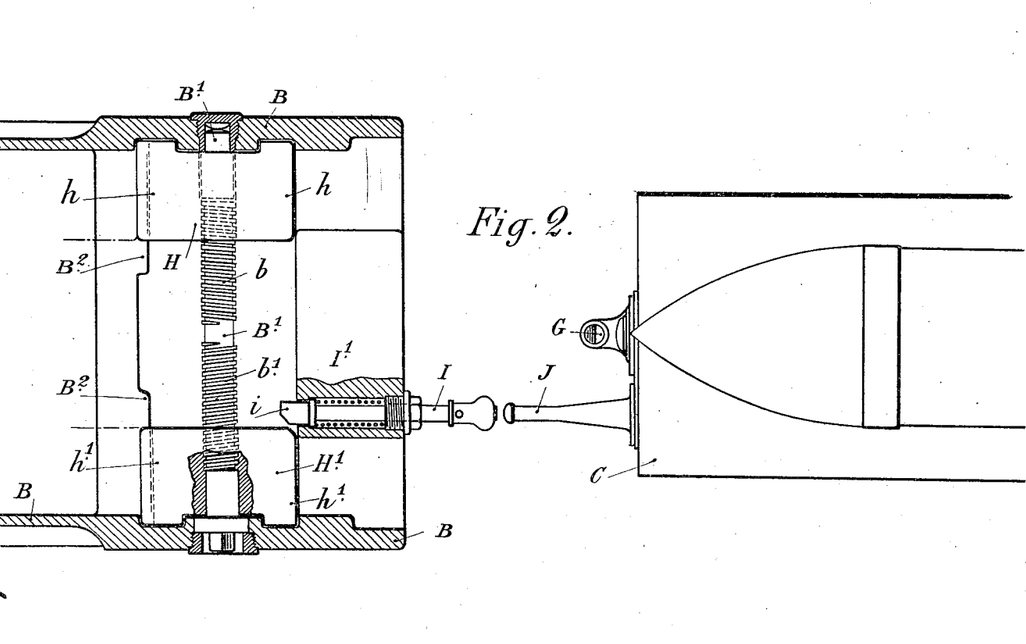

The locking is complete only when the nuts H, $H^1$ are at their maximum distance apart, as shown in Figs. 1 and 2. To separate the gun from its slide, the nuts are moved into the positions shown in Figs. 3 and 4.

The dependent movable member which is the characteristic feature of this invention, is constituted by a spring slide member I located in the slide B in the path of a projection or stop J carried by the loading truck C.

$i$ is a nose on the sliding member I. When the safety apparatus is inoperative, this nose $i$ is normally pushed by the spring $I^1$ into the position wherein the said nose $i$ is situated in the path of one of the nuts $H^1$.

Figures 3, 4:
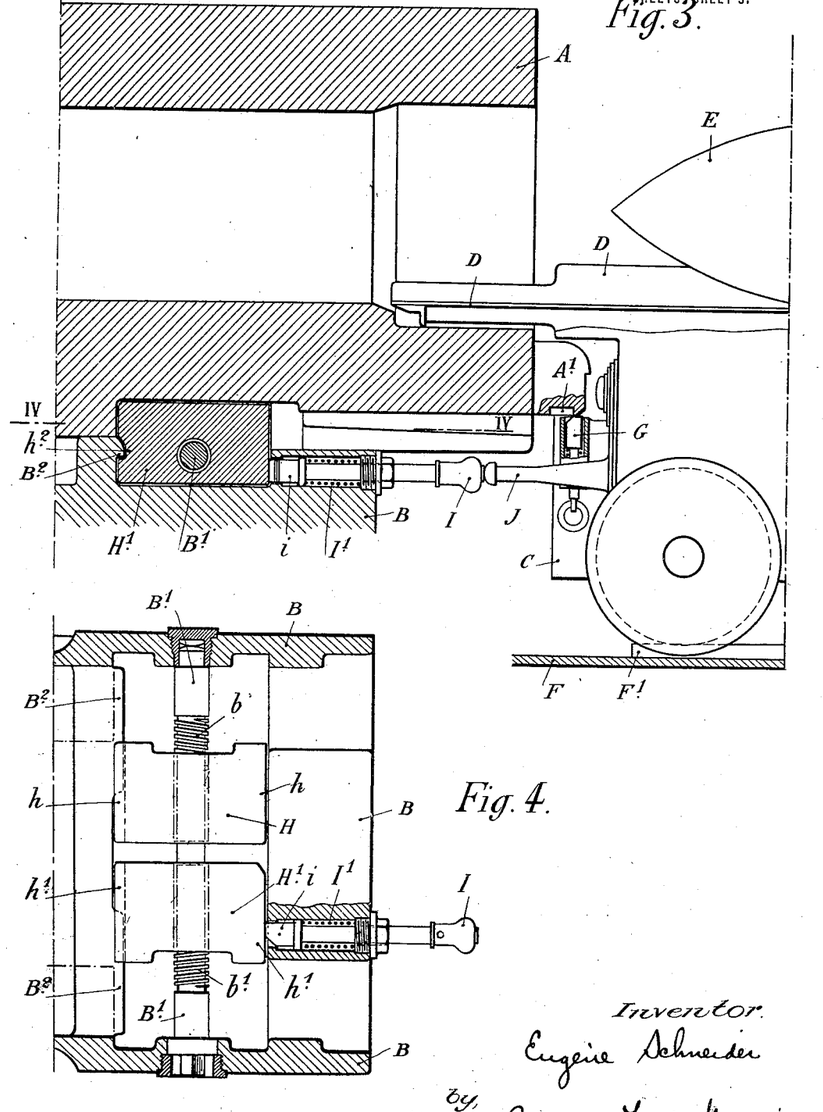
Fig. 3 is a partial vertical section similar to Fig. 1 illustrating the operation of the safety apparatus in the case of the locking between the gun barrel and its slide being incomplete.
Fig. 4 is a partial horizontal section on the line IV—IV of Fig. 3.
Figure 5:
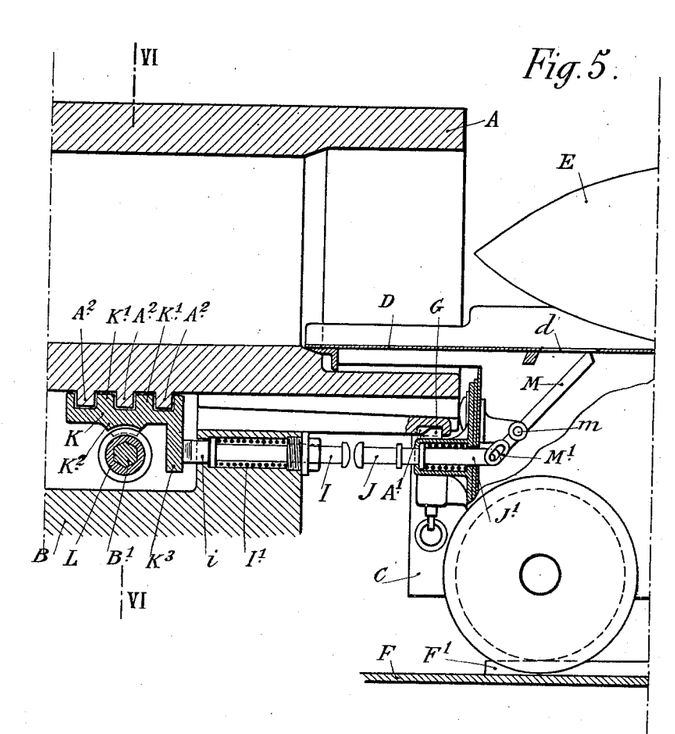
Fig. 5 is a longitudinal vertical section showing the parts of the fastening mechanism between the loading truck and the gun barrel in the closed position.
Figure 6:
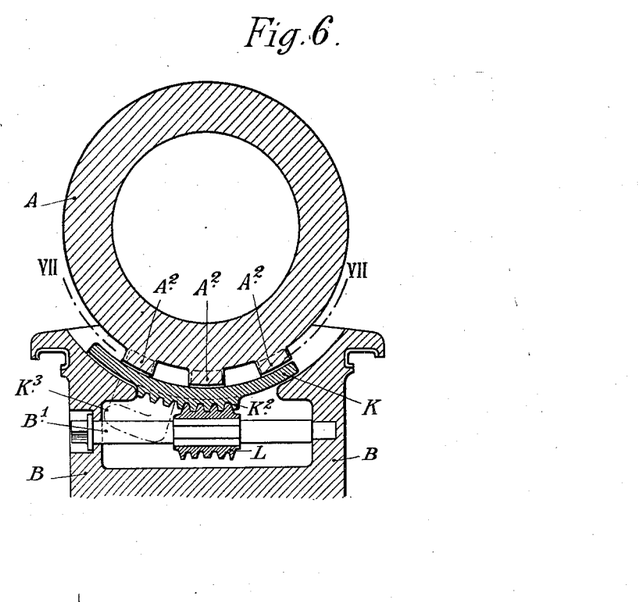
Fig. 6 is a corresponding cross section on the line VI—VI of Fig. 5.
Figure 7:
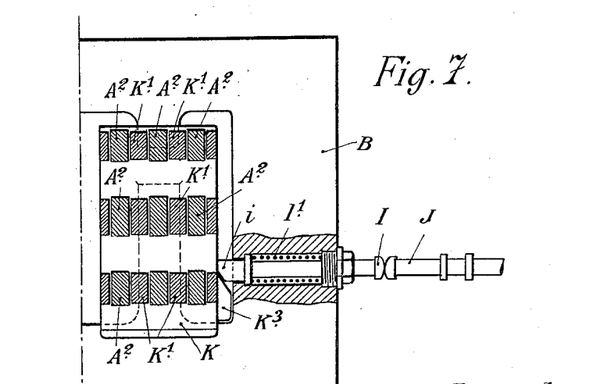
Fig. 7 is a horizontal section on the line VII—VII of Fig. 6.

So long as the nut $H^1$ is in position to lock completely the gun barrel to the slide (Figs. 1 and 2), the projection of the sliding member I to the rear of the slide does not prevent the loading truck from advancing into the desired position for allowing interengagement to take place between the bolt G and the socket $A^1$. If, on the contrary, the locking mechanism between the gun barrel A and its slide B is unlocked, the nut $H^1$ will keep the nose $i$ of the sliding member I pushed toward the rear (Figs. 3 and 4).

The sliding member I will then project to such an extent as to prevent the advance of the stop J into the position required for allowing the bolt G to engage the socket $A^1$.

Figure 8:
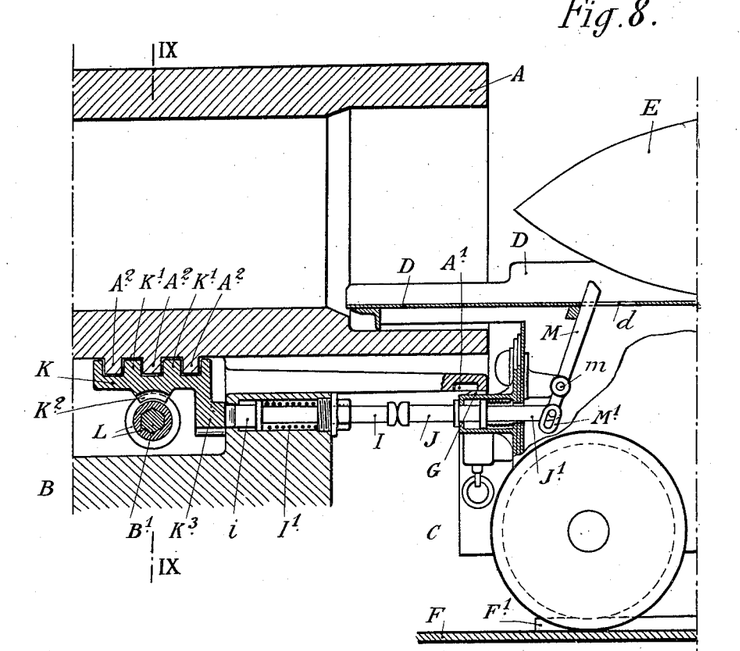
Fig. 8 is a longitudinal vertical section illustrating the operation of the improved safety apparatus.
Figure 9:
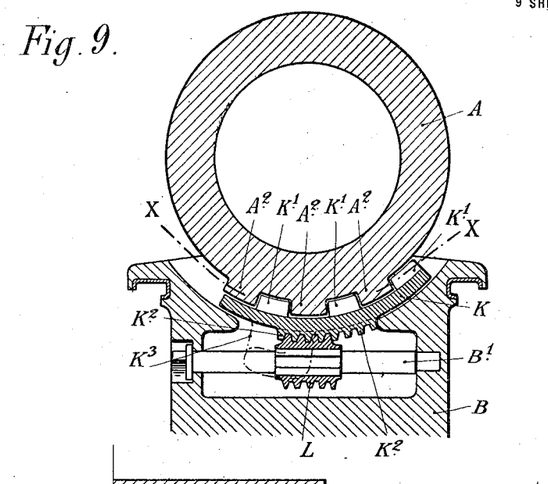
Fig. 9 is a cross section thereof on the line IX—IX of Fig. 8.
Figure 10:
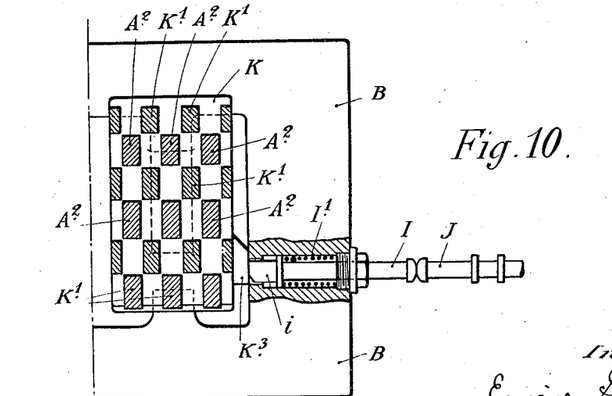
Fig. 10 is a horizontal section on the line X—X of Fig. 9.

In the embodiment illustrated in Figs. 5 to 10, the locking of the gun barrel to its slide is assumed to be effected by means of an arc-shaped member K formed on its upper face with projections $K^1$ engaging between projections $A^2$ formed on the gun barrel. The arc-shaped member K is further provided on its underside with helical teeth $K^2$ engaged by a worm L journaled in the slide B. By operating the worm L in the desired direction, the gun barrel will be locked to or unlocked from its slide. The arc-shaped member K is formed laterally with a nose $K^3$ adapted to press outwardly the spring sliding member I—$i$ so long as the gun barrel is not locked to its slide (Figs. 8, 9 and 10). When, on the contrary, the gun barrel is completely locked to its slide (Figs. 5, 6 and 7), the spring $I^1$ will move the nose $i$ of the sliding member I into the path of the nose $K^3$ of the arc-shaped member K. In this constructional example, the stop J instead of being stationary as in the preceding example, is now assumed to be constructed in the form of a spring stem provided at its rear end with an extension $J^1$ to which is joined one of the arms of a rocking beam $M^1$—M fulcrumed on an axle $m$ on the loading truck C. The arm M of this rocking beam constitutes a finger which so long as the spring stem is in the position shown in Figs. 8 to 10, projects with its free end through a slot $d$ in the loading plate D, and thereby forms a supplementary obstacle to the loading by preventing the advance of the projectile.

Figure 11:
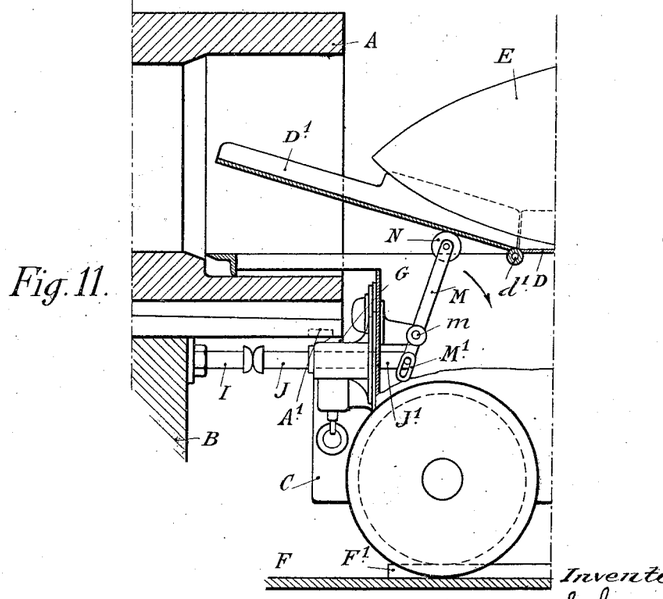
Fig. 11 is a partial vertical longitudinal section of a modification.

In the embodiment illustrated in Fig. 11, the arm M of the rocking beam M—$M^1$ carries at its free end a roller N which, when the parts are in the position shown in Figs. 8 to 10 (wherein the gun barrel is not locked to its slide), lifts up the front part $D^1$ of tht loading plate which in this case is hinged at $d^1$ to the main part D of the said plate.

Figure 12:
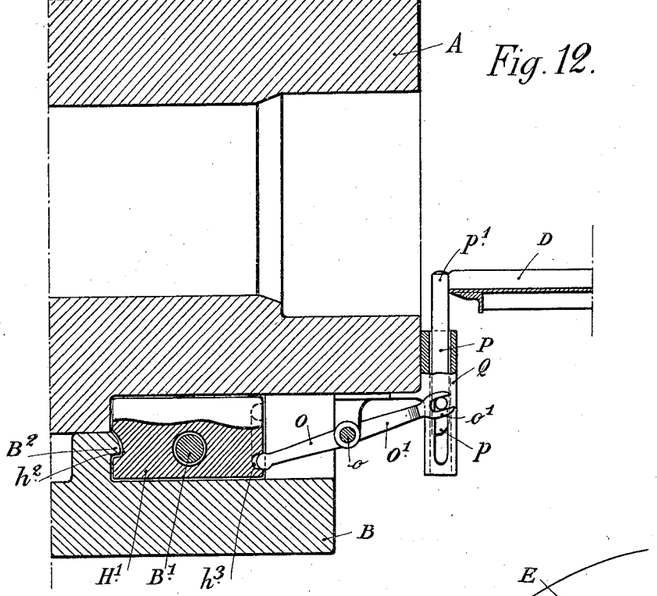
Fig. 12 is a vertical longitudinal section showing the parts of the locking mechanism between the gun barrel and its slide in their unlocked position.
Figure 13:
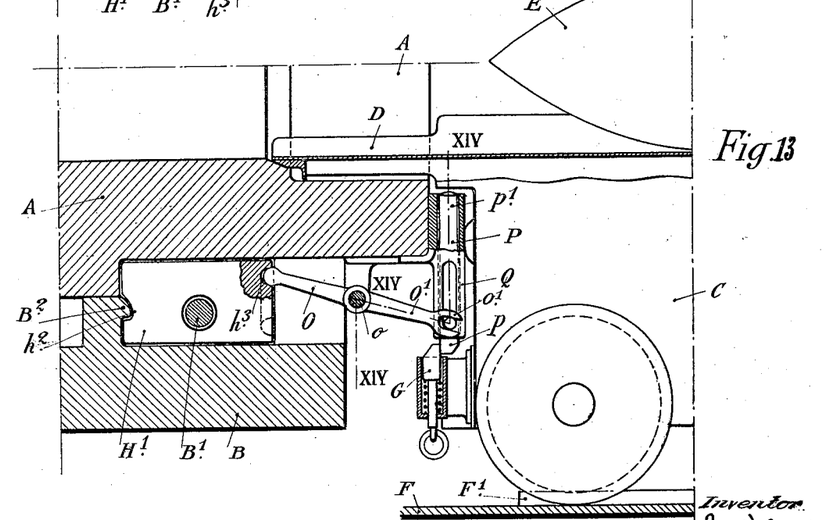
Figs. 13 and 14 are respectively a longitudinal vertical section and a vertical cross section on the line XIV—XIV of Fig. 13, showing the parts of the improved safety apparatus in their inoperative position after the loading truck has been fastened to the breech of the gun.
Figure 14:
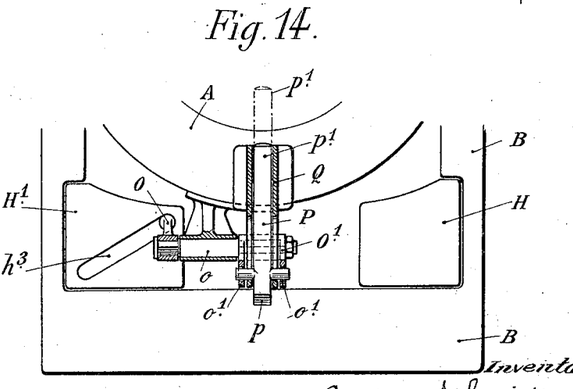

In the modification shown in Figs. 12, 13 and 14, the movable member dependent on one of the parts of the locking mechanism between the gun barrel and its slide, is constituted by a lever O—$o$—$O^1$ fulcrumed at $o$ on the breech of the gun. The end of the arm O of the lever is guided in a slot $h^3$ formed in the rear face of the nut $H^1$, the inclination of said slot being such that in the movements of the nut, the controlled rocking beam is caused to rock into the end positions indicated in full lines respectively in Fig. 12, and in Figs. 13 and 14. The arm $O^1$ of the lever operates in its rocking movements by means of a fork $o^1$, a slideblock P which is suitably guided on the rear face of the breech, for instance in a guide Q.

The lower end $p$ of the slideblock P forms a nose for engaging the bolt G carried by the loading truck. The upper end $p^1$ of the said slideblock forms a stop for arresting the loading plate D so long as the gun barrel is not locked to its slide.

Figure 15:
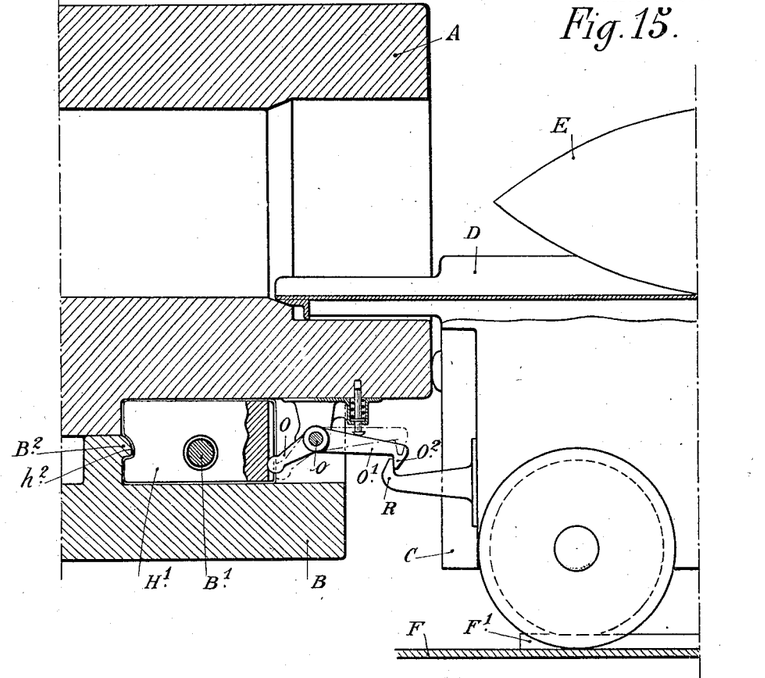
Fig. 15 is a vertical longitudinal section of another modification.

In the embodiment shown in Fig. 15, the dependent movable member constitutes itself one of the parts of the fastening mechanism between the gun barrel and the loading truck.

The said movable member may consist of a rocking beam O—O$^1$ fulcrumed at $o$ on the breech of the gun. The arm O of the rocking beam is moved by the nut H$^1$, by the thrust of a beveled portion formed on the latter, alternately into the position indicated in full lines or into the position indicated by dash and dot lines.

The arm O$^1$ carries at its free end a hook O$^2$ which according as the rocking beam is depressed into the position shown in full lines, or is raised into the position shown in dash and dot lines, is able or unable to engage a hook R carried by the loading truck C. It will be understood that the arm O$^1$ of the rocking beam may control a stop analogous to the stop $p$ of the preceding example, or a finger for lifting the pivoted front portion of the loading plate D.

What I claim is:—

1. In a safety apparatus of the character described, the combination of a gun and its slide, a loading truck, and a device for securing said truck in loading position at the breech of the gun, with mechanism for locking and unlocking the gun and its slide, and a member movable into position to prevent the operation of said securing device, said member being in operative relation with said locking mechanism when the latter is unlocked.

2. In a safety apparatus of the character described, the combination of the gun and its slide, means locking the two together, and shiftable to unlock the same, with a loading truck, a device for fastening the same in loading position at the breech of the gun, a sliding spring member movable into a position to prevent said truck from reaching loading position and in operative engagement with a part of said locking means when the latter is in unlocked position.

3. In a safety apparatus of the character described, the combination of the gun and its slide, means locking the two together and shiftable to unlock the same, with a loading truck, a device for fastening the same in loading position at the breech of the gun, a sliding spring member movable into a position to prevent said truck from reaching loading position and in operative engagement with a part of said locking means when the latter is in unlocked position, means shiftable by said spring member into and out of the path of the projectile between the latter and the gun breech.

4. In a safety apparatus of the character described, the combination of the gun and its slide, means locking the two together and shiftable to unlock the same, with a loading truck, a device for fastening the same in loading position at the breech of the gun, a sliding spring member movable into a position to prevent said truck from reaching loading position and in operative engagement with a part of said locking means when the latter is in unlocked position, and a flap pivoted to the fore part of said truck and shiftable by said spring member into and out of the path of the projectile between the latter and the gun breech.

5. In a safety apparatus of the character described, the combination of the gun and its slide, with mechanism for locking the two together, a loading truck, a catch device for securing said truck in loading position at the breech of the gun, and means operable by one of the moving parts of said locking mechanism to prevent the engagement of said catch device when the gun and slide are unlocked.

6. In a safety apparatus of the character described, the combination of the gun and its slide, with mechanism for locking the two together, a loading truck, a two-part catch device for securing said truck in loading position at the breech of the gun, one of said parts being on the breech of the gun and the other on said truck, and means operable by one of the moving parts of said locking mechanism to prevent the engagement of the two parts of said catch device when the gun and slide are unlocked.

In testimony whereof I have signed this specification.

EUGÈNE SCHNEIDER.

Copies of this patent may be obtained for five cents each, by addressing the "Commissioner of Patents, Washington, D. C."